United States Patent Office.

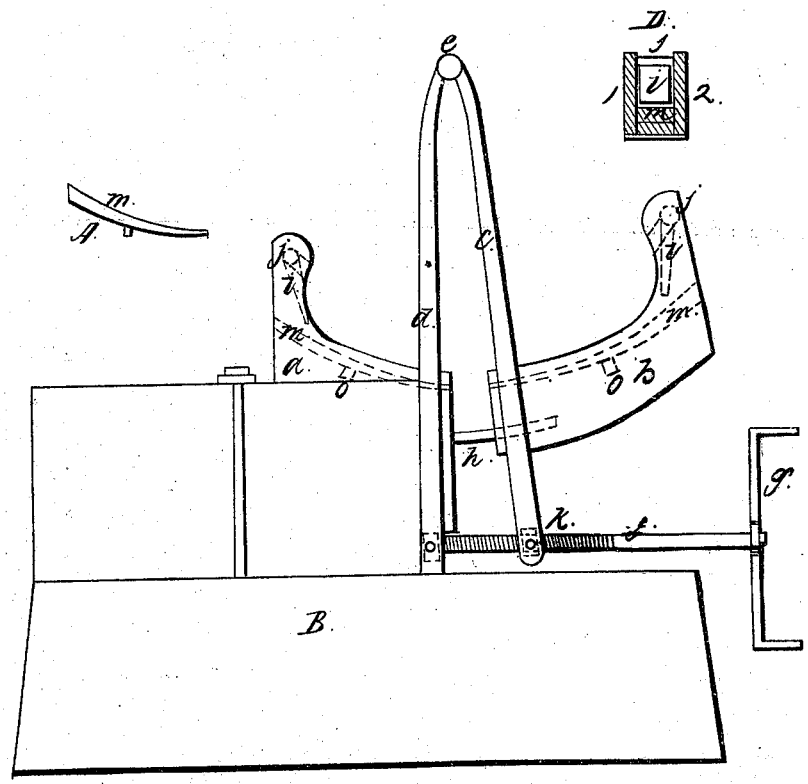

ALBERT WINSHIP, OF TURNER, MAINE.

Letters Patent No. 89,823, dated May 4, 1869.

---

IMPROVEMENT IN TIRE-UPSETTING MACHINE.

---

The Schedule referred to in these Letters Patent and making part of the same.

---

*To all whom it may concern:*

Be it known that I, ALBERT WINSHIP, of Turner, in the county of Androscoggin, and State of Maine, have invented a new and useful Improved Upsetter for Tiers; and I hereby declare the following to be a full, clear, and exact description thereof, which will enable others to make and use my invention, reference being had to the accompanying drawings, forming part of this specification, in which is shown a side elevation of my invention, and a detail of the removable beds, at A. At D is shown an end view of one of the two curved parts $a$ $b$.

I am aware that patents have been granted on upsetting-machines for tires, having two curved parts, like $a$ $b$, and operated by various mechanical means. Such I do not claim.

A particular description of my device will illustrate its character.

The device rests on a convenient base, as B, to which base one of the curved beds $a$ is rigidly attached.

The other bed, $b$, is hung on the pivoted vertical arm $c$, which is united with another vertical fixed arm, $d$.

$e$ is the joint of the two arms.

$f$ is a right-and-left screw, operated by the double crank $g$.

The arm $c$ is rigidly attached to the bed $b$, so as to carry the same toward or from the bed $a$, as the arm $c$ is moved by the outer half of the right-and-left screw.

There are four of the arms $d$ $c$, two on each side of the beds $a$ $b$; but in the side view, shown in the drawing, only two are illustrated.

$h$ is a curved tongue, fixed in the stationary bed $a$, and moving in and out of a recess in the movable bed $b$, as the said bed $b$ is drawn back or forward.

This imparts evenness to the motion of $b$, and keeps it in place.

The two arms $c$, one not shown, being on the other side of $b$, are moved simultaneously, by the screw $f$, by means of a cross-bar, indicated by dotted lines at $k$, having a female screw for the screw $f$ to work in.

$i$ $i'$ show two dogs or catches, suspended at $j$, with lower ends to press the tire, and hold it from moving, while being contracted.

The two sides of the bed, and the slot therein, are shown at D, 1, 2, with the dog $i$ at that end, and the movable bed $m$.

These dogs $i$ $i'$ are movable in inclined slots, shown by dotted lines $n$.

The removable beds $m$ are secured in place by studs $o$, fitting into small holes in the beds $a$ $b$. By reference to A, it will be seen they are made thicker at the upper end than the other. This is to accommodate the beds to different curvatures or sizes of tires.

As many different removable beds as may be desired can, of course, be employed.

The dogs will apply either to the fixed or removable beds, by being made a little longer in the one case than in the other.

The operation is as follows:

The tire, being heated, is placed in the slot of the beds $a$ $b$, the same being moved to the proper position to hold the wheel or circle of the tire. The dogs $i$ $i'$ are then brought to bear on the tire, and the two beds then brought together by the screw $f$, &c., and the tire thus contracted or "upset."

It is obvious that the position of the beds, near the bottom of the arms $c$ $d$, and their joint $e$ being elevated some distance above the beds, gives great purchase to the machine.

These arms $c$ $d$ and beds $a$ $b$, &c., can be used in a common vise, if desired.

What I claim as my invention, and desire to secure by Letters Patent, is—

1. The combination of the beds $a$ $b$, having the false beds $m$, when desired, and removable dogs $i$, with the arms $d$ $c$, and right-and-left screw $f$, when the bed $a$ is fixed and the bed $b$ removable, and when the two beds are placed near the bottom of the arms $d$ $c$, all as and for the purposes set forth.

2. The removable or false beds $m$, secured by studs $o$, to be applied to a tire-upsetter, as herein set forth, and used in combination with dogs $i$, as and for the purposes set forth.

ALBERT WINSHIP.

Witnesses:
STEPHEN H. SPENCER,
JOSIAH W. HOBBS.